Jan. 16, 1940.  O. TODRYS  2,187,368

CHANGE SPEED GEAR FOR BICYCLES

Filed Oct. 7, 1939

OTTO TODRYS
INVENTOR

BY *Joseph Blacker*

ATTORNEY

Patented Jan. 16, 1940

2,187,368

UNITED STATES PATENT OFFICE 2,187,368

CHANGE SPEED GEAR FOR BICYCLES

Otto Todrys, New York, N. Y., assignor to France Sporting Inc., New York, N. Y., a corporation of New York Application October 7, 1939, Serial No. 298,418

2 Claims. (Cl. 74—21.7)

This invention relates to improvements in change speed gear mechanism for bicycles and the like and more particularly to mechanism of the type in which the driving chain is moved from one to another of different sized sprockets by transverse displacement by a jockey sprocket.

In the usual construction of changeable speed gear mechanism for bicycles, difficulty has been found in alining the movable shifting housing with the stationary rocker bracket with the result that a very great force was required for actuating the flexible cable and the attached chain.

An object of this invention is to provide improved means for facilitating the alignment of the movable shifting bracket with the stationary bracket so as to minimize the pulling force required for the chain.

Another object of this invention resides more particularly in the special construction and disposition of the aligning means for actuating the co-acting parts in parallel relation and whereby the driving chain may be selectively engaged with any one of a plurality of different sized sprockets on the driving wheel hub so as to obtain the desired speed ratio with ease.

With the above and other objects in view, the invention will be hereinafter more particularly described, and the combination and arrangement of parts will be shown in the accompanying drawing and pointed out in the claims which form part of this specification.

Reference will now be had to the drawing, wherein like numerals of reference designate corresponding parts throughout the several views, in which.

Figure 1:
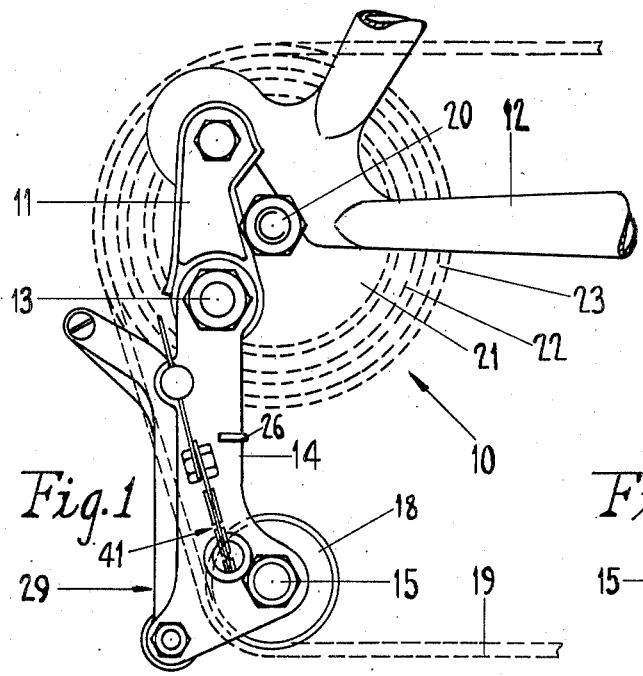
Figure 1 is a fragmentary side elevation of the mechanism and parts of the bicycle.
Figure 2:
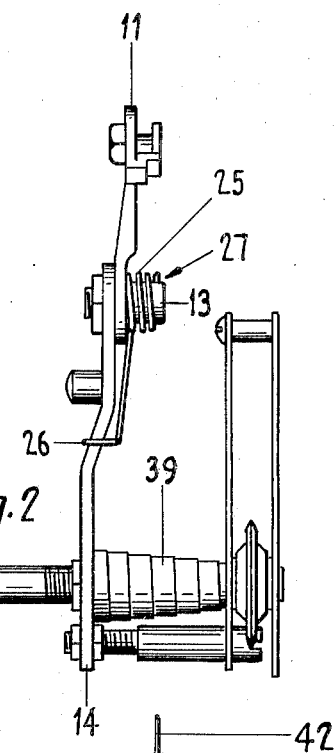
Figure 2 is a front elevation of the mechanism shown in Figure 1.

In the illustrated embodiment of the invention, the numeral 10 indicates a change speed gear mechanism comprising a bracket arm 11 fixed to the frame 12 of the bicycle. Mounted on a pivot 13 at the lower end of the arm 11 is a rocker bracket 14 having secured thereto a tubular member 15. The tubular member 15 is in parallel relation with the pivot 13 and has an elongated thread 16. Slidably mounted in the tubular member 15 is a spindle 17 having a jockey sprocket 18 rotatably mounted thereon. The jockey sprocket 18 has an outwardly tapering periphery adapted for engagement with a sprocket chain 19.

Rotatably mounted on the axle 20 is a set of interconnected sprocket wheels 21, 22 and 23 of different diameters. The chain 19 is long enough to engage the jockey sprocket and one of the said sprocket wheels. A coil spring 25 mounted on the pivot 13 has one of its ends 26 hooked to the rocker bracket 14 and the other end hooked in a slot 27 in the pivot 13. The pivot 13 is fixed to the bracket arm 11, but is rotatable in the rocker bracket 14. The spring 25 is tensioned in a direction tending to press the rocker bracket to the left of the position shown in Figure 1 and this motion tightens the chain 19 irrespective of the diameter of the sprocket wheel with which the chain is in engagement.

Figure 4:
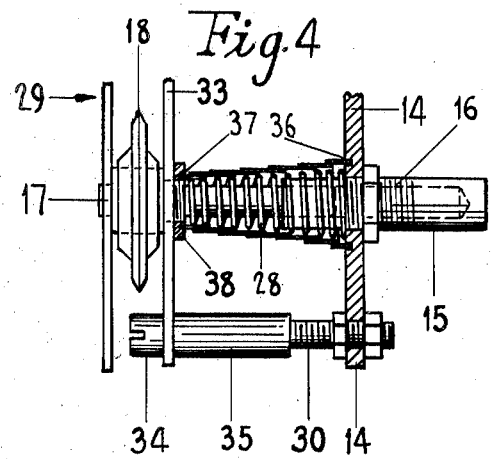
Figure 4 is a cross-sectional view of the jockey sprocket mounting.

As shown in Figure 4, a conical coil spring 28 has been mounted on the spindle 17. The spring 28 reacts against the rocker bracket 14 and presses against a shifting housing 29 in which the spindle 17 has been mounted and forces the housing away from the rocker bracket 14 and moves the jockey sprocket in a direction transverse to the frame of the bicycle.

Figure 3:
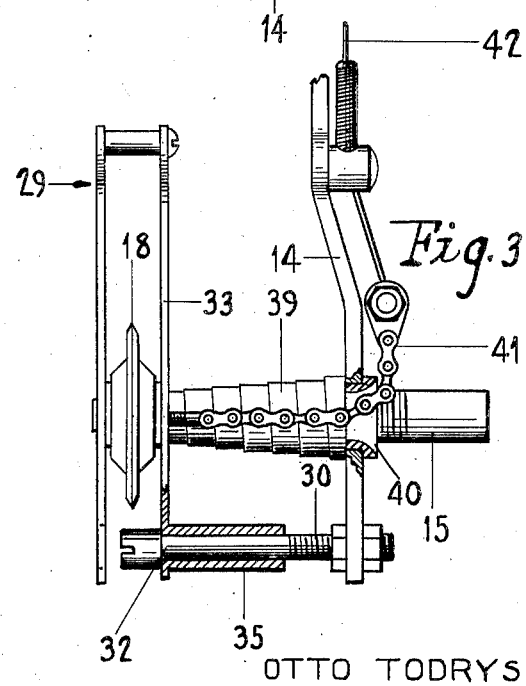
Figure 3 is a rear elevation of the mechanism on an enlarged scale and partly in section.

As shown in Figure 3, the transverse displacement of the shifting housing 29 is limited by the length of the body of a guide rod 30 designed for sliding movement through an aperture 32 in the inner arm 33 of the housing. The head 34 of the guide rod is larger than the body 30 and acts as a stop against further separation of the members 14 and 33.

For the purpose of this invention which is to facilitate the alignment of the movable shifting bracket 29 with the rocker bracket 14, I have provided an elongated sleeve 35 integral with the inner arm 33 and in contacting slidable relation with the body of the guide rod 30. The elongated sleeve is of a length to engage a substantial portion of the rod body and provides a long bearing surface which retains alignment of the stationary and moving parts.

As shown in Figure 4, I have provided a circular receiving channel 36 in the rocker bracket 14, and a circular receiving channel 37 in a threaded member 38 in fixed relation with the inner arm 33 of the housing 29. The channels 36 and 37 are in concentric relation with the spindle 17. A spiral spring 39 made of ribbon-like spring steel and arranged with the successive coils in contacting relation has been mounted in the channels 36 and 37. The spring 39 forms a reinforcing housing for the spindle 17. During all movements of the shifting housing 29, the two circular channels 36 and 37 are retained by the spring 39 in central alignment and this augments the alignment of the stationary and movable parts.

I have provided a bushing 40 having a comparatively large radius at the outer end and forming a bell-mouth opening. The bushing 40 has been fixed in the rocker bracket with the large radius facing outwardly. The bell-mouth outer surface contacts with a comparatively long surface of the chain 41 in all positions of adjustment and facilitates the movement of the chain while under stress, that is, the bell-shaped mouth prevents point contact between the chain and the surface of the chain aperture in the rocker bracket.

The control chain 41 has been mounted in eccentric relation with the spring housing 39 and in eccentric relation with the jockey sprocket. The application of the chain 41 is at a point intermediate the spindle 17 and the line of motion of the sprocket chain 19. This intermediate position of the chain 41 balances the control chain pull on the return spring 28 and the frictional drag of the sprocket chain against the shifting housing and augments the alignment of the stationary and movable parts.

In operation, a pull on the wire 42 by means well known in the art, causes the control chain 41 to shift the jockey sprocket 18 sideways and this motion draws the driving chain 19 sideways which thus jumps from one sprocket wheel to another. The spring 25 tensions the rocker bracket 14 and takes up the slack in the driving chain.

I claim:

1. In a change speed gear mechanism of the class described, comprising a shifting housing in which a jockey sprocket is rotatably mounted on a spindle and being movable to and from a rocker bracket, a tubular member secured to said rocker bracket and in engagement with a spindle secured to said shifting housing, said shifting housing and said rocker bracket having circular channels concentric with said spindle, and a spring reinforcing housing made of ribbon-like spring steel with the coils in contacting relation and seating in said channels for augmenting the alignment of said shifting housing with said rocker bracket.

2. In a change speed gear mechanism of the class described, comprising a shifting housing in which a jockey sprocket is rotatably mounted on a spindle and being movable to and from a rocker bracket, a tubular member secured to said rocker bracket and in engagement with a spindle secured to said shifting housing, said shifting housing and said rocker bracket having circular channels concentric with said spindle, a reinforcing housing made of ribbon-like spring steel with the coils in contacting relation and seating in said channels, a guide rod secured to said rocker bracket and being in slidable engagement with an elongated sleeve integral with said shifting housing, said elongated sleeve being in spaced parallel relation with said reinforcing housing and serving to align said shifting housing with said rocker bracket in all of their relative slidable positions.

OTTO TODRYS.